United States Patent [19]

Pomares

[11] 4,293,972
[45] Oct. 13, 1981

[54] HANDLE ATTACHING MEANS FOR BROOMS AND THE LIKE

[76] Inventor: Francis Pomares, 124 Russell St., White Plains, N.Y. 10606

[21] Appl. No.: 88,649

[22] Filed: Oct. 26, 1979

[51] Int. Cl.³ ............... A46B 15/00; F16B 35/06
[52] U.S. Cl. ............................... 15/145; 15/176; 403/4; 403/263
[58] Field of Search ............ 15/143 R, 143 B, 144 R, 15/145, 146, 159 R, 176; 403/247, 252, 263, 4

[56] References Cited
FOREIGN PATENT DOCUMENTS 807963  1/1937  France .................................. 403/4
194161 11/1937  Switzerland ........................... 403/4
 25935 of 1913  United Kingdom .................. 403/4

Primary Examiner—Edward L. Roberts
Attorney, Agent, or Firm—Eugene E. Geoffrey, Jr.

[57] ABSTRACT

Handle attaching means for brooms and the like consisting of a tubular member having a portion of large diameter for receiving and holding a handle and a portion of reduced diameter for insertion into an opening in a broom, the portion of reduced diameter having openings to receive a bolt which also engages a second opening in the broom to hold the tubular member in engagement therewith.

6 Claims, 6 Drawing Figures

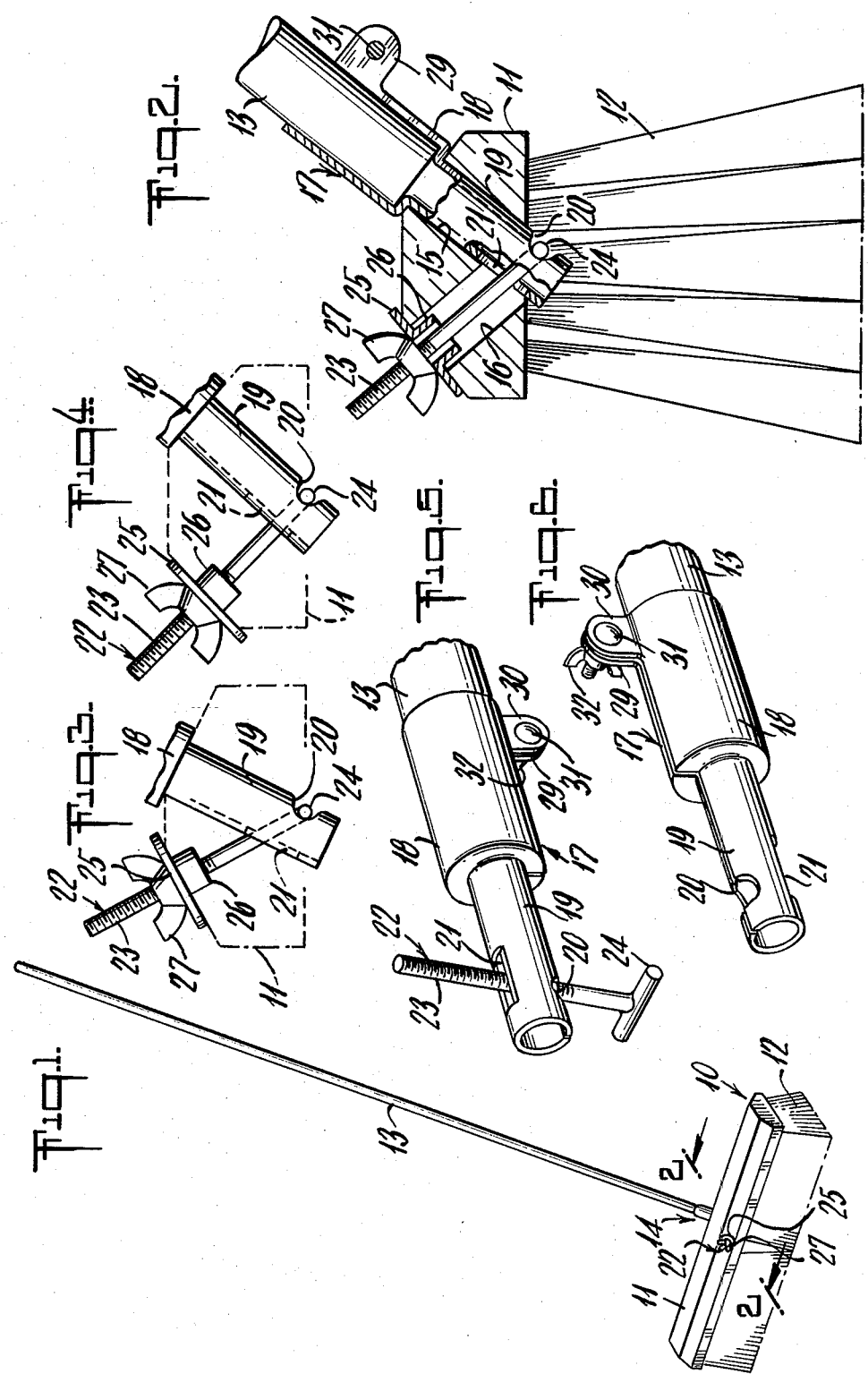

HANDLE ATTACHING MEANS FOR BROOMS AND THE LIKE

This invention relates to handle attaching means for brooms and the like and more specifically to novel and improved means for affixing handles to push brooms and similar devices which provides a secure and dependable attachment and at the same time permits the handle to be quickly and easily removed.

Known procedures for the attachment of handles to push brooms and other similar devices include the provision of threads on the end of the handle and a threaded recess in the device to which the handle is to be attached. Handles are normally formed of wood and in the case of push brooms the head of the broom is usually formed of wood and carries bristles extending downwardly therefrom. In actual practice, it has been found that the threads on the handle and/or the threads in the threaded recess on the broom often become stripped with a result that both the handle and the broom must be discarded. In many cases, the broom is provided with two angularly disposed threaded openings so that if the threads on the handle are in good condition, the handle can merely be moved to the second opening. However, this is often unsatisfactory since the purpose of the two openings in the head of the broom is to provide for reversing the broom after the bristles have taken a set in one direction. Other procedures for the attachment of handles to brooms and the like involve material revision in the construction of the broom and the handle attaching means with the result that the cost is materially increased and failure of the attaching means usually requires complete replacement of the broom and handle.

This invention resides in the provision of novel and improved means for attaching a handle whether of wood or metal to a broom which provides a dependable and secure attachment and at the same time facilitates reversal of the broom on the handle should the bristles take a set in one direction. Moreover, any failure in the attaching means does not necessitate discarding the handle and the broom but merely the replacement of the attaching means per se.

Another object of the invention resides in the provision of novel and improved attaching means for affixing a handle to a broom and other similar device which is characterized by its simplicity, ease of installation and relatively low cost. By reason of the structure of the attaching device, the formation of threads on either the handle or the broom head are not required and the broom handle can be readily replaced or interchanged.

Still another object of the invention resides in the provision of a novel and improved attaching means for affixing handles to brooms and other similar devices.

The handle attaching means in accordance with one form of the invention includes a tubular member having an enlarged handle receiving and holding portion and a portion of smaller diameter for insertion into an opening in the head of a broom having a pair of angularly disposed openings. The portion of smaller diameter has diametral openings adjoining the end thereof to receive a bolt which extends through the other of the angularly disposed openings and holds the tubular member in position in first opening.

The above and other objects and advantages of this invention will become more apparent from the following description and accompanying drawings forming part of this application.

IN THE DRAWINGS

FIG. 1 is a perspective view of a push broom embodying handle attaching means in accordance with the invention;

FIG. 2 is an enlarged cross sectional view of FIG. 1 taken along the line 2—2 thereof;

FIGS. 3 and 4 are side elevational views of the handle attaching means shown in FIG. 2 but with the broom head shown in phantom to illustrate the adaptability of the handle attaching means to brooms wherein the openings are positioned at different angular relationships; and FIGS. 5 and 6 are two different perspective views of the handle attaching means in accordance with the invention to illustrate structural details thereof.

Referring now to the drawings, the numeral 10 denotes a conventionally appearing push broom having a head portion 11 generally formed of wood which carries downwardly extending bristles 12. A handle 13 is affixed centrally of the head 11 and extends angularly upwardly therefrom. In the illustrated embodiment of the invention, the handle 13 is affixed to the broom head 11 by novel and improved attaching means generally denoted by the numeral 14.

The broom head 11 is normally provided with a pair of angularly disposed openings 15 and 16 as illustrated more clearly in FIG. 2. As previously pointed out, conventional procedures involve threading of these openings to facilitate the attachment of a handle having a threaded end portion. With this invention however the threads in the openings 15 and 16 are not required and the two openings are utilized to accommodate the attaching means 14. It will also be observed as the description proceeds that the handle can be positioned in either of the openings 15 or 16 as may be desired.

More specifically, the attaching means 14 in accordance with the invention includes an enlarged handle receiving portion 18 and a portion of smaller diameter or shank 19 extending therefrom. The shank 19 is provided with a pair of openings 20 and 21 adjoining the end thereof and these openings are arranged so that the opening 20 extends below the bottom surface of the head 11 when the shank is inserted in one of the openings 15 or 16 and the opening 21 is essentially aligned with the other of the openings in the head. As will be observed in FIGS. 5 and 6, the opening 20 is essentially of circular configuration while the opening 21 is of generally elongated rectangular configuration.

The handle attaching means 17 is held in position on the head of the broom by means of a T-shaped bolt generally denoted by the numeral 22 and has an elongated threaded shank 23 and a transverse head 24. The shank 23 of the bolt 22 is inserted through the opening 20 and the opening 21 after the handle attaching means 17 is inserted in the broom as shown in FIG. 2. Because the opening 20 is of circular section, the head 24 of the bolt nests in the opening and will automatically be prevented from rotating. The threaded shank 23 of the bolt extends through the other of the two openings 15 or 16 as the case may be. A self aligning washer 25 having a depending flange 26 is placed over the bolt and a wing nut 27 is threaded on to the shank 23 of the bolt which functions to firmly hold the attaching means 17 in position on the broom.

In order to facilitate both manufacture of the attaching means 17 and at the same time accommodate handles 13 of slightly differing diameters, the attaching means 17 as illustrated more clearly in FIG. 6 is provided with a longitudinal slot 28 which extends through both the enlarged cylindrical portion 18 as well as the shank 19. The slot intersects the opening 20 and the enlarged portion 17 includes at least one pair of ears or tabs 29 and 30 each having an opening to accommodate the bolt 31 and cooperating nut 32. With this arrangement, handles 13 of slightly varying diameters can be accommodated readily by the attaching means 17 and the handle will be held firmly in place.

FIGS. 3 and 4 indicate the adaptability of the novel and improved handle attaching means for use on brooms having different angular positions of the holes 15 and 16 in the head 11. In FIG. 3, it will be observed that the angle between the two holes is relatively small but because of the utilization of the rectangular opening 21 in the attaching means 17 the bolt 22 may be readily shifted to facilitate engagement with one opening while the attaching means is positioned in the other opening. FIG. 4 is similar to FIG. 3 but illustrates a condition wherein the openings are at an angle of approximately 90°. Here again, the attaching means is readily held securely in position on the head 11.

From the foregoing description, it is evident that the handle attaching means in accordance with the invention affords a secure and relatively inexpensive means for securing a handle to a broom or other similar device and at the same time avoids the complication entailed in providing the screw threads both on the handle as well as within the broom openings. Moreover, should it be necessary to replace the handle, it is not necessary to get a special handle that will fit the particular broom or other device, as any handle of approximately the desired diameter can be readily secured in position.

While only one embodiment of the invention has been illustrated and described, it is understood that alterations, changes and modifications may be made therein without departing from the true scope and spirit thereof.

What is claimed is:

1. A handle attachment for push brooms and the like having an elongated head with at least two angularly disposed openings positioned transversely of the head comprising tubular handle attaching means having an enlarged handle receiving and holding portion and a shank portion of smaller cross sectional area than and extending from said enlarged portion, the end of said shank portion having a pair of diametrically disposed and aligned openings, and an elongated bolt extending through said pair of openings, said bolt having a head portion engaging said shank portion to prevent rotation of said bolt and a cooperating nut, whereby insertion of said shank portion in one of said angularly disposed openings with said bolt extending through said aligned shank openings and the other angularly disposed opening and held in position by said nut secures said handle attaching means in position.

2. A handle attachment according to claim 1 wherein said bolt has an elongated threaded shank and said head is in the form of a rod secured to an end of the threaded shank and extending transversely thereof.

3. A handle attachment for push brooms and the like having an elongated head with at least two angularly disposed openings positioned transversely of the head comprising tubular handle attaching means having an enlarged handle receiving and holding portion and a shank portion of smaller cross sectional area than and extending from said enlarged portion, the end of said shank portion having a pair of diametrically disposed and aligned openings, and an elongated bolt extending through said pair of openings whereby insertion of said shank portion in one of said angularly disposed openings with said bolt extending through the other angularly disposed opening secures said handle attaching means in position, said bolt having an elongated threaded shank and a head in the form of a rod secured to an end of the threaded shank and extending transversely thereof, one of said pair of openings being of elongated configuration to permit angular adjustment of said bolt relative to said shank.

4. A handle attachment according to claim 3 wherein said tubular handle attaching means includes a longitudinal slot extending throughout the length thereof and intersecting the other of said pair of openings.

5. A handle attachment according to claim 4 wherein said enlarged handle receiving portion includes means for clamping it tightly about said handle.

6. A handle attachment according to claim 5 wherein said clamping means comprises at least one pair of ears on said enlarged portion adjoining the edges of said slot and a bolt extending through openings in said ears.

* * * * *